(12) United States Patent  (10) Patent No.: US 7,878,913 B2
Bouzit et al.  (45) Date of Patent: Feb. 1, 2011

(54) DECOUPLING TORSIONAL DISTURBANCE IN A VEHICLE POWERTRAIN

(75) Inventors: Djamel Bouzit, Ann Arbor, MI (US); Matthew A. Vance, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 437 days.

(21) Appl. No.: 11/924,834

(22) Filed: Oct. 26, 2007

(65) Prior Publication Data

US 2009/0111589 A1    Apr. 30, 2009

(51) Int. Cl.
   *F16D 3/78* (2006.01)
(52) U.S. Cl. .......................................... 464/93; 464/98
(58) Field of Classification Search .................. 464/71, 464/72, 92–96, 98, 99, 46, 160, 134, 38; 403/224
   See application file for complete search history.

(56) References Cited

U.S. PATENT DOCUMENTS

| 293,141 | A | * | 2/1884 | Brotherhood ................. 464/99 |
| 1,701,470 | A | * | 2/1929 | Baker |
| 2,107,689 | A | * | 2/1938 | Bugatti ..................... 464/93 X |
| 3,100,974 | A | * | 8/1963 | Wilson et al. ................ 464/46 |
| 3,724,239 | A | * | 4/1973 | Calistrat ..................... 464/92 |
| 3,995,448 | A | | 12/1976 | Wright |
| 4,825,983 | A | | 5/1989 | Nakanishi |
| 5,214,975 | A | | 6/1993 | Zalewski |
| 6,213,882 | B1 | * | 4/2001 | Okada et al. ............ 464/160 X |
| 6,217,453 | B1 | | 4/2001 | Thompson |
| 6,293,871 | B1 | | 9/2001 | Geislinger |
| 6,626,763 | B2 | * | 9/2003 | Aoki et al. ..................... 464/99 |
| 6,659,819 | B2 | | 12/2003 | Fuse |
| 6,685,570 | B2 | * | 2/2004 | Zilberman et al. ............ 464/94 |
| 6,840,862 | B2 | | 1/2005 | Daniel |
| 6,874,606 | B1 | * | 4/2005 | Heidenreich ................. 464/48 |
| 2003/0022720 | A1 | | 1/2003 | Takei |
| 2004/0198499 | A1 | | 10/2004 | Kamdem et al. |
| 2007/0017768 | A1 | | 1/2007 | Alvarez et al. |

FOREIGN PATENT DOCUMENTS

| DE | 691 589 | * | 5/1940 | .................. 464/92 |
| DE | 692 762 | * | 6/1940 | .................. 464/92 |
| GB | 1427099 | A | | 3/1976 |
| GB | 1582208 | A | | 1/1981 |

OTHER PUBLICATIONS

Machinery's Handbook, 25th ed., New York, International Press, 1996. p. 383. TJ151.m3 1996.*

* cited by examiner

*Primary Examiner*—Greg Binda
(74) *Attorney, Agent, or Firm*—David B. Kelley; MacMillan, Sobanski & Todd, LLC

(57) ABSTRACT

A decoupler assembly for a motor vehicle driveline comprising a decoupler, an input driveably connected to a transmission output shaft and including a first connection that secures the input to the decoupler, and an output driveably connected to a final drive axle then to wheels of the vehicle, including a second connection that secures the output to the decoupler, and a support that provides bending continuity between the input and the output, the support permitting rotation of the input about an axis relative to the output, the decoupler, the first connection and the second connection providing resistance to such rotation.

11 Claims, 6 Drawing Sheets

US 7,878,913 B2

DECOUPLING TORSIONAL DISTURBANCE IN A VEHICLE POWERTRAIN

BACKGROUND OF THE INVENTION

1. Field of the Invention

This invention relates generally to a motor vehicle powertrain, and, in particular, to an apparatus for torsionally decoupling components of a vehicle powertrain.

2. Description of the Prior Art

Power plants used in cars, SUVs, and trucks tend to generate torsional disturbances primarily of an impulsive nature, that degrade customer-perceived noise, vibration and harshness (NVH) quality both transients including clunk, thump, rattle, roughness, and steady state disturbances including gear whine, moan, growl. The durability of vehicle powertrains, whose sources for such disturbances are an engine and transmission, can be adversely affected by these disturbances.

Furthermore, a vehicle driveline, including its driveshaft and axle, has inherent torsional resonance modes that tend to be sympathetic to such disturbances or aligned with corresponding torsional modes within the transmission mechanism. This modal alignment causes significant amplification of both axle and transmission gear noise.

Several types of dampers are widely used in the industry to minimize the negative effects of such tensional excitation forces. Their performance is limited to a narrow tuning frequency range and amplitude reduction provided by the mass and damping. Moreover, their complexity, added weight and cost are undesired.

Other solutions use flexible couplings in lieu of typical U-joints or CV joints. However, these couplings tend to deteriorate significantly powertrain bending characteristics and significantly limit the driveline angle capacity required for a solid beam axle application, thus inducing risks to NVH quality and durability including critical speed.

SUMMARY OF THE INVENTION

A decoupler assembly for a motor vehicle driveline comprising a decoupler, an input driveably connected to a transmission output shaft and including a first connection that secures the input to the decoupler, and an output driveably connected to wheels of the vehicle, including a second connection that secures the output to the decoupler, and a support that provides bending continuity between the input and the output, the support permitting rotation of the input about an axis relative to the output, the decoupler, the first connection and the second connection providing resistance to such rotation.

The torsional decoupler reduces or eliminates the NVH issues efficiently from both transient events and steady state events. The device torsionally decouples the driveline from the power plant while maintaining the integrity of the powertrain bending characteristics and the angular capacity of the drive shaft.

The flexible decoupler provides an efficient, robust solution to torque induced disturbances with a low weight penalty, precise targeting of the torsional vibration characteristics to be eliminated, while leaving all other needed design characteristics unaffected.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
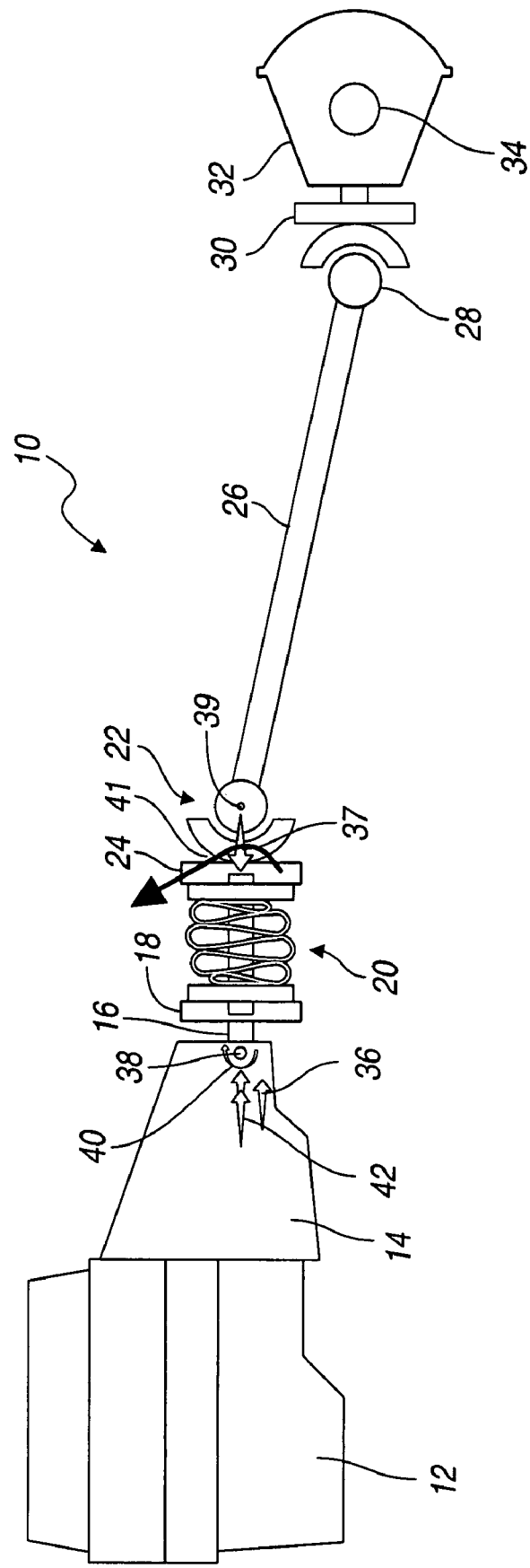
FIG. 1 is a schematic side view of a motor vehicle powertrain that includes a torsional decoupler assembly.

The powertrain 10 of FIG. 1 includes an engine 12, transmission 14 driveably connected to the engine, transmission output shaft 16 and output flange 18, a decoupler 20, a first universal joint 22 having a flange 24, driveshaft 26, second universal joint 28 having a flange 30, and a inter-wheel differential 32, that transmits power differentially to axle shafts 34, which extend laterally to the wheels of the vehicle.

Output shaft 16 and output flange 18 are formed as an integral unit or are connected mutually such that they function structurally as a unit. Flange 24 is secured to universal joint 22 such that they function structurally as a unit.

Decoupler 20 provides bending continuity with unaffected overall rigidity, axial force continuity, and lateral force continuity between transmission output 16 and universal joint 22, but not torsional continuity. Axial force continuity provided by decoupler 20 between transmission output 16 and universal joint 22 is represented by vectors 36, 37. Lateral force continuity provided by decoupler 20 between transmission output 16 and universal joint 22 is represented by vectors 38, 39. Bending continuity provided by decoupler 20 between transmission output 16 and universal joint 22 is represented by vectors 40, 41, respectively. But torsional disturbance represented by vector 42 cannot be transmitted across decoupler 20 in either direction. But the nominal powertrain torque (DC torque) from output shaft 16 is entirely transmitted across decoupler 20 to the driveshaft joint 22.

Figure 2:
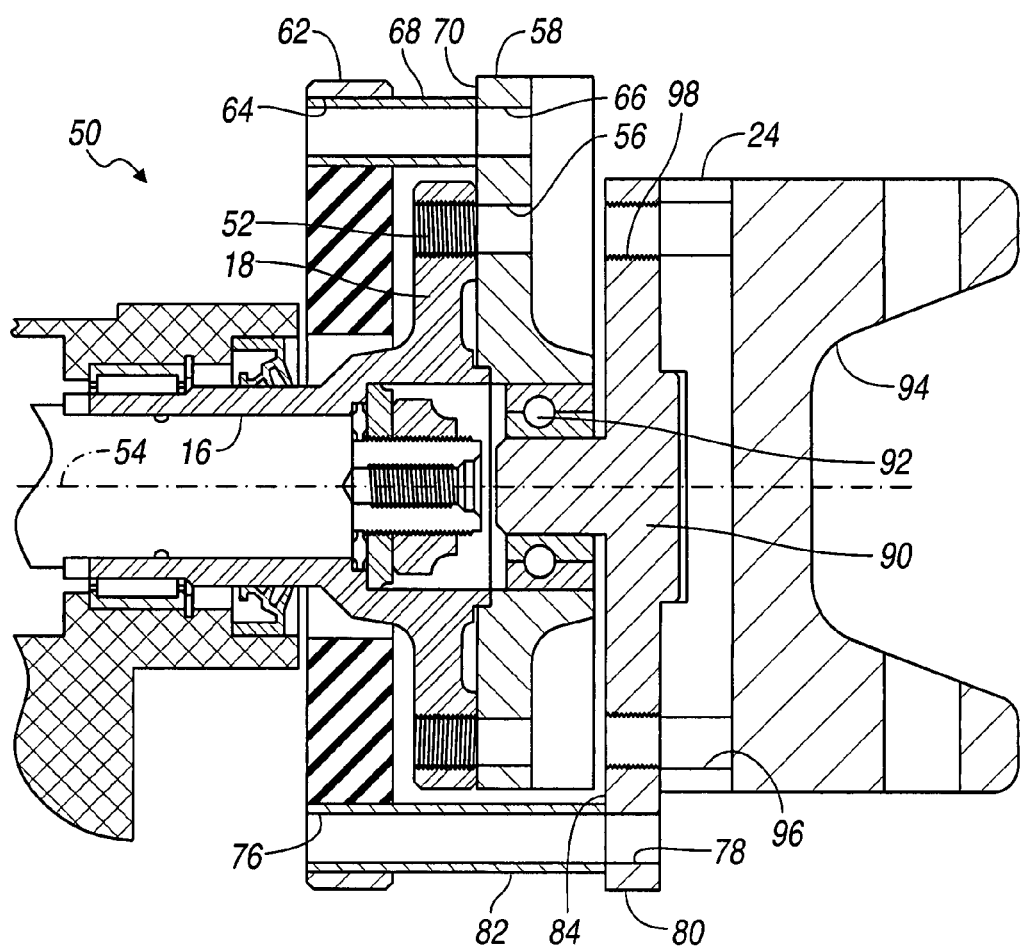
FIG. 2 is cross sectional side view of a first embodiment of a decoupler assembly for use in the powertrain shown in FIG. 1.
Figure 3:
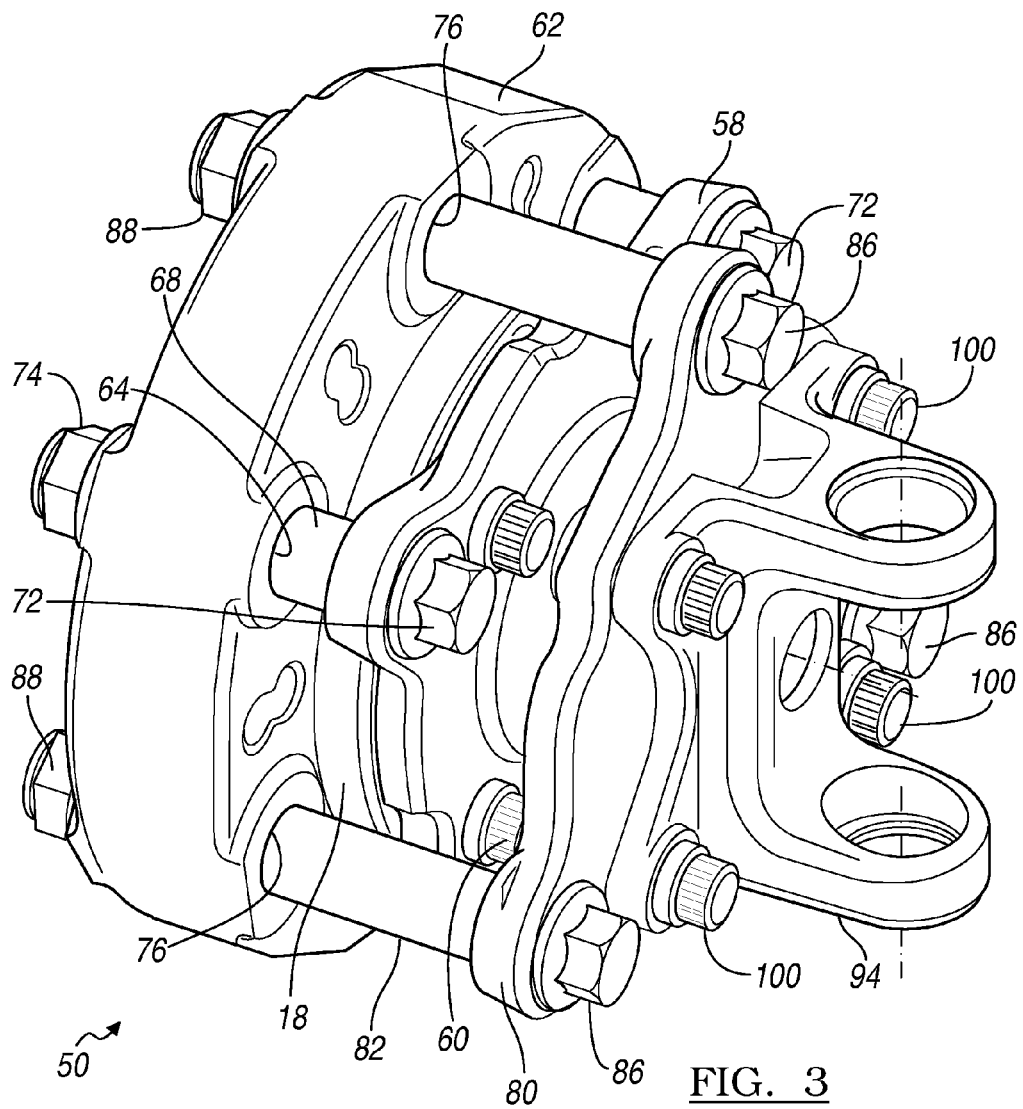
FIG. 3 is a perspective view of the decoupler assembly shown in FIG. 2.

A decoupler assembly 50 having the desired structural functions described with reference to FIG. 1 is illustrated in FIGS. 2 and 3. Transmission output shaft 16 is an input to the decoupler assembly 50. Flange 18 is formed with a series of tapped holes 52, spaced angularly about an axis 54 and aligned with holes 56 formed in a flange extension 58. A bolt 60 is fitted into each of holes 56, and the threads of bolts 60 engage the threads tapped in holes 52, thereby providing bending, lateral force or axially force continuity between flange extension 58 and the transmission output shaft 16 and its flange 18.

A flexible disc decoupler 62 is not secured to output shaft 16. The flexible decoupler 62, which is preferably formed of flexible rubber or a flexible synthetic material, is formed with a series of holes 64, spaced angularly about axis 54 and aligned with holes 66 formed in flange extension 58. Cylindrical spacers 68, located in holes 64, each abut the axial face 70 of flange extension 58. An attachment bolt 72, fitted into each of holes 66 and each of sleeves 68, is engaged by a nut 74, thereby providing virtually no bending, lateral force or axially force continuity between flexible decoupler 62 and flange extension 58.

Decoupler 62 is also formed with a series of holes 76, spaced angularly about axis 54 and aligned with holes 78 formed in a positioning adapter 80. Cylindrical spacers 82, located in holes 76, each abut the axial face 84 of positioning adapter 80. An attachment bolt 86, fitted into each of holes 78 and each of sleeves 82, is engaged by a nut 88.

As FIG. 2 shows, flange extension 58 is formed with a journal, which is supported on a cylindrical journal 90 of positioning adapter 80 by a bearing 92 such that the flange extension is free to rotate about axis 54, but for the minimal torsional resistance provided by flexible decoupler 62, the connection provided by bolts 72 between flange extension 80 and decoupler 62, and the connection provided by bolts 86 between decoupler 62 and positioning adapter 80.

The universal joint 22 at the forward end of driveshaft 26 is secured to a fitting 94, which is formed with holes 96 that are aligned with tapped holes 98 formed in positioning adapter 80. Fitting 94 is connected to positioning adapter 80 by bolts 100, which are fitted into holes 96 and engaged with the threads of tapped holes 98.

In operation, bending about any axis normal to axis 54 is transmitted between output shaft 16 and fitting 94 through the torsional decoupler 50 and is carried by extension 58, bearing 92 and journal 90. A flexible, low torsional stiffness load path between output shaft 16 and fitting 94 is provided by flexible decoupler 62, the connection provided by bolts 72 between flange extension 58 and decoupler 62, and the connection provided by bolts 86 between decoupler 62 and positioning adapter 80.

Figure 4:
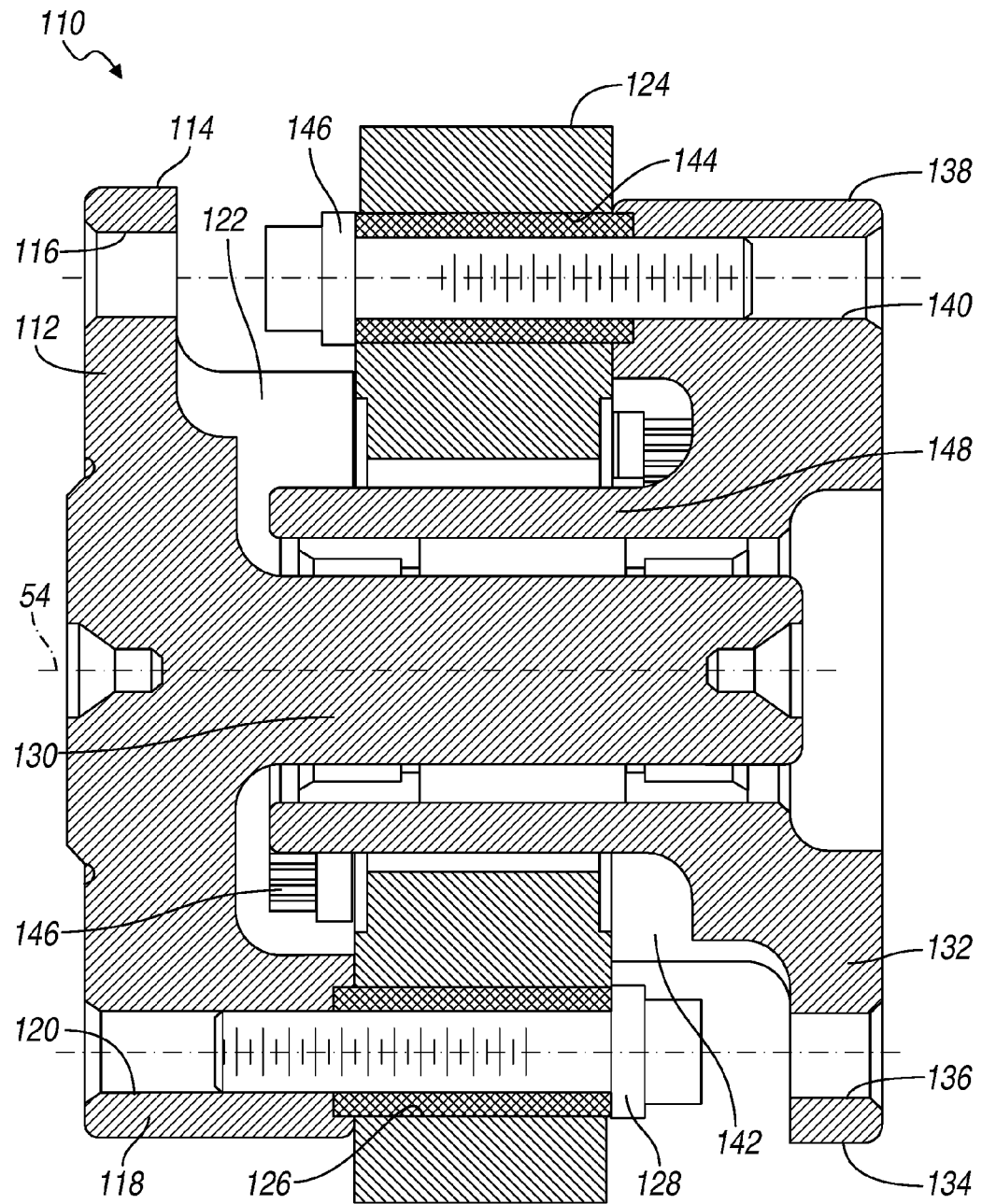
FIG. 4 is cross sectional side view of a second embodiment of a decoupler assembly for use in the powertrain shown in FIG. 1.
Figure 5:
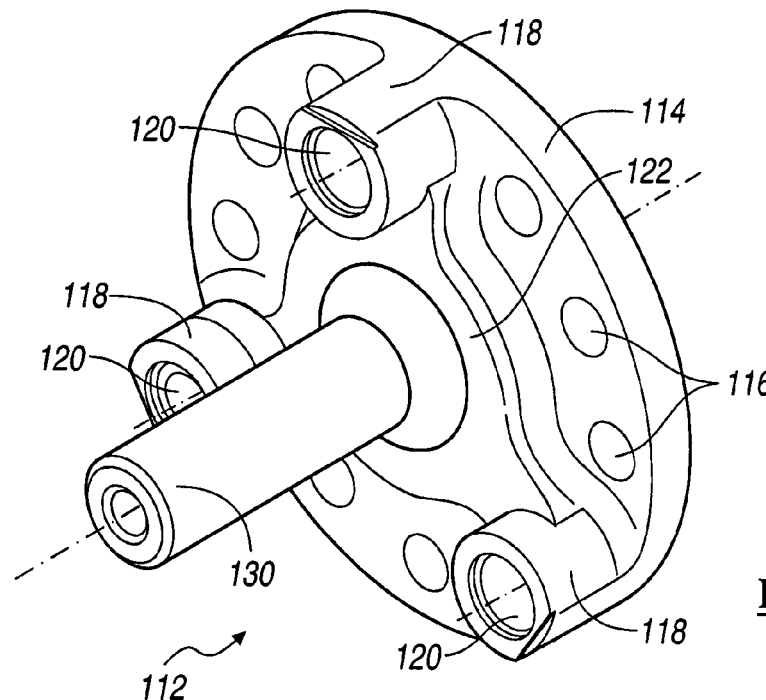
FIG. 5 is a perspective view of a fitting for the decoupler assembly shown in FIG. 4.
Figure 6:
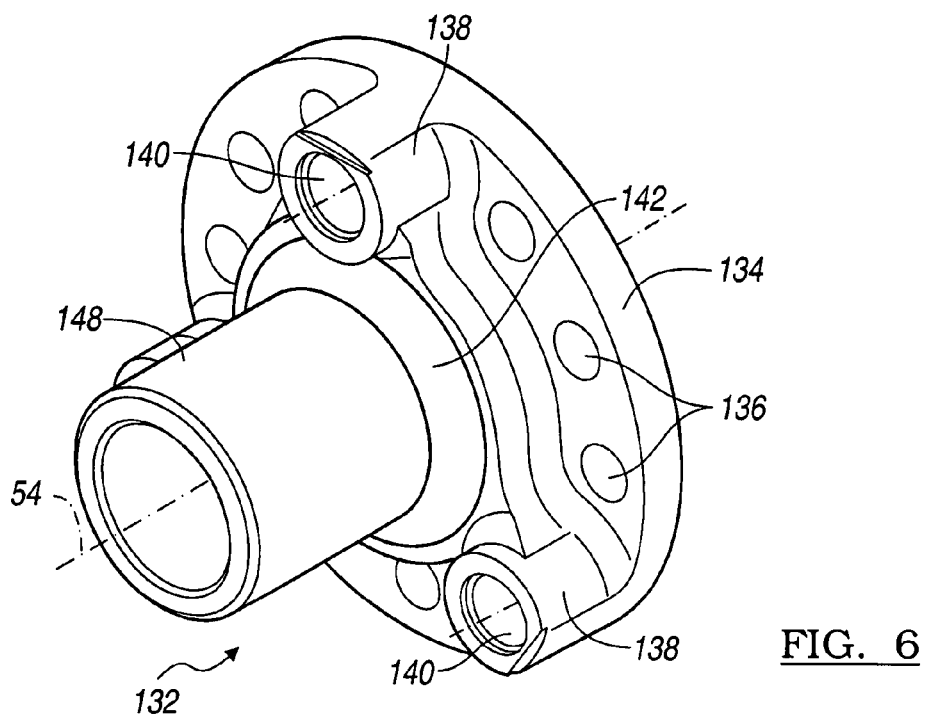
FIG. 6 is a perspective view of a second fitting for the decoupler assembly shown in FIG. 4.
Figure 7:
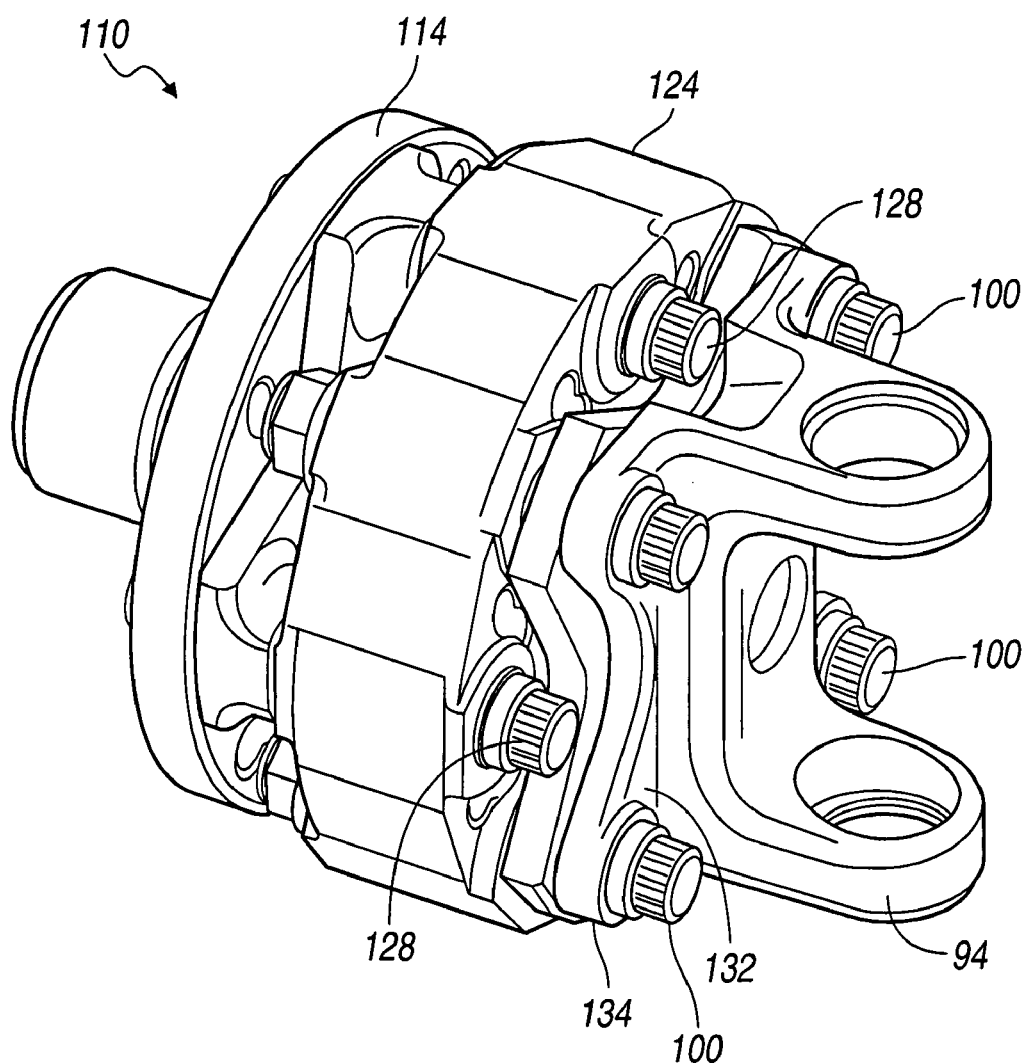
FIG. 7 is a perspective view of a second embodiment fitting for the decoupler assembly shown in FIG. 4.

Decoupler 110, a second embodiment having the desired structural functions described with reference to FIG. 1, is illustrated in FIGS. 4-6. Fitting 112 includes a flange 114 formed with series of bolt holes 116, angularly spaced about axis 54 and by which output shaft 16 is secured to fitting 112. Fitting 112 includes three bosses 118 angularly spaced about axis 54 and formed with holes 120. A shoulder 122 provides a surface facing a decoupler disc 124, which is preferably formed of flexible rubber or a flexible synthetic material and with a series of holes 126, spaced angularly about axis 54 and aligned with holes 120. Bolts 128, fitted in holes 126, engage threads tapped in holes 120 and secure decoupler disc 124 and fitting 112 mutually. Fitting 112 includes a cylindrical journal 130 concentric with axis 54.

A second fitting 132 includes a flange 134 formed with series of bolt holes 136 angularly spaced about axis 54, by which fitting 94 or universal joint 22 are secured to fitting 132. Fitting 132 includes three bosses 138 angularly spaced about axis 54 and formed with holes 140. A shoulder 142 provides a surface facing decoupler disc 120, which is preferably formed with a series of holes 144, spaced angularly about axis 54 and aligned with holes 140. Bolts 146, fitted in holes 144, engage threads tapped in holes 140 and secure decoupler disc 124 and fitting 132 mutually.

Fitting 132 includes a cylindrical journal 148 concentric with axis 54 and surrounding journal 130. Roller bearings or needle bearings are located in an annular space between journals 130 and 148.

In operation, bending about any axis normal to axis 54 is transmitted between output shaft 16 and fitting 94 or universal joint 22 through the torsional decoupler 110. The load path for transmitting bending and lateral force is provided by the overlapping journals 130, 148. A highly flexible, low torsional stiffness load path between output shaft 16 and fitting 94 is provided by flexible decoupler disc 124, the connection provided by bolts 128 between fitting 112 and decoupler disc 124, and the connection provided by bolts 146 between decoupler disc 124 and fitting 132.

Each decoupler assembly 50, 110 may be installed at any interface in the vehicle driveline, but is preferably located at the transmission-to-driveshaft interface. Each decoupler 50, 110 maintains low vibration amplitudes caused by powertrain bending excitation moments by providing bending stiffness continuity. The decoupler assemblies 50, 110 bypass the torsional excitation disturbing moments through an independent elastic torsional spring having a low torsional stiffness. The decoupler assemblies 50, 110 decouple the driveline/driveshaft torsional modes of vibration from the engine/transmission torsional modes of vibration, preserve the universal joint that will the provide necessary angle capacity and shield the torsional decoupler from bending excessively, and dampen the torsional vibration amplitude for both transient events of steady state harmonics.

The decoupler assemblies 50, 110 may include flexible decouplers 62, 124 that are flexible rubber circular couplings as shown in the figure, or rubber pucks arranged in a circular fashion working in compression, or metallic springs arranged in circular fashion.

Preferably input shaft 16, flange 18, flange extension 58, positioning adapter 80, fitting 94, and fittings 114, 134 are formed of metal having a modulus of elasticity in the range $15.0 \times 10^6$-$30.0 \times 10^6$ pounds per square inch.

The flexible decoupler 62 is sized to accommodate the driveshaft-to-transmission interface standard circular flange outer diameter for the given application. The inner diameter is sized to accommodate the adapter pilot with standard bearings. The decoupler 62 can be of a synthetic material having a shear modulus in the range $0.1 \times 10^6$-$0.3 \times 10^6$ pounds per square inch, or the decoupler can be of rubber having a durometer in the range from 50 to 65 with a thickness range of 15-30 mm. An acceptable range for its torsional stiffness is 100-4500 lb-in per degree, when assembled as shown in FIGS. 2 and 4 depending on the nominal transmitted powertrain torque and on the frequency range of the torque disturbances.

In accordance with the provisions of the patent statutes, the preferred embodiment has been described. However, it should be noted that the alternate embodiments can be practiced otherwise than as specifically illustrated and described.

What is claimed is:

1. A decoupler assembly, comprising:

an input;

a decoupler disc formed with first and second axial holes spaced about an axis;

an extension secured to the input, supported by a bearing on an adapter for rotation about the axis, and including a first journal and third holes aligned axially with the first holes;

the adapter secured to the decoupler and including a second journal and fourth holes aligned axially with the second holes, the bearing being located between the first and second journals;

first bolts extending axially past the input, through and connecting the extension and the decoupler through the first holes and the third holes; and second bolts extending axially past the input, through and connecting the adapter and the decoupler through the second holes and the fourth holes.

2. The decoupler assembly of claim 1, wherein:
the decoupler is formed of rubber having a durometer in a range 50-65 and a synthetic material having a shear modulus in the range $0.1 \times 10^6$-$0.3 \times 10^6$ pounds per square inch.

3. The decoupler assembly of claim 1, wherein:
the input is a transmission output shaft; and
an output is driveably connected to wheels of a vehicle through a final drive axle.

4. The decoupler assembly of claim 1, wherein:
the input includes fifth axial holes spaced angularly about the axis;
the extension is a disc formed with sixth axial holes spaced angularly about the axis and aligned with the fifth holes; and
third bolts connecting the input and the extension mutually through the fifth and sixth holes.

5. A decoupler assembly for a motor vehicle driveline comprising:
a decoupler disc formed with first and second axial holes spaced angularly about an axis;
an input;
an extension including a first journal, and third holes aligned axially with the first holes;
an adapter including a second journal, and fourth holes aligned axially with the second holes;
a bearing located between the first and second journals;
first bolts connecting the extension and the decoupler mutually through the first holes and the third holes; and
second bolts connecting the adapter and the decoupler mutually through the second holes and the fourth holes;
the input and extension located axially between the decoupler and the adapter, the extension secured to the decoupler and the input, the assembly providing a path through which torsion can be continually transmitted without interruption from the input, to the extension, the decoupler and the adapter.

6. The decoupler assembly of claim 5, wherein:
the decoupler is formed of flexible rubber having a durometer in a range 50-65 and a synthetic material having a shear modulus in the range $0.1 \times 10^6$-$0.3 \times 10^6$ pounds per square inch.

7. The decoupler assembly of claim 5, wherein:
the first journal is formed on the extension and extends along the axis;
the second journal is formed on the adapter and extends along the axis; and
the bearing is located in an annular space between and contacting the first journal and the second journal.

8. The decoupler assembly of claim 5, wherein the decoupler has a torsional stiffness in a range 100-4500 lb-in per degree.

9. A decoupler assembly comprising:
a decoupler disc formed with first axial holes spaced angularly about an axis, and second axial holes spaced angularly about the axis;
an extension supported by a bearing on the adapter for rotation about the axis, and including third holes aligned axially with the first holes;
an adapter including fourth holes aligned axially with the second holes
first bolts extending axially through and interconnecting the extension and the decoupler through the first holes and the third holes;
second bolts extending axially through and interconnecting the adapter and the decoupler through the second holes and the fourth holes;
the assembly providing a path through which torsion is transmitted among the decoupler, extension and adapter through the first and second bolts.

10. The decoupler assembly of claim 9, wherein:
the extension includes a first journal;
the adapter includes a second journal, the bearing being located between the first and second journals.

11. A decoupler assembly, comprising
an input;
a decoupler disc formed with first axial holes spaced angularly about an axis, and second axial holes spaced angularly about the axis;
an extension secured to the input, supported by a bearing on the adapter for rotation about the axis and including third holes aligned axially with the first holes;
an adapter secured to the decoupler and including fourth holes aligned axially with the second holes;
first bolts extending axially past the input, through and connecting the extension and the decoupler mutually through the first holes and the third holes; and
second bolts extending axially past the input, through and connecting the adapter and the decoupler mutually through the second holes and the fourth holes.

* * * * *